June 16, 1964   D. I. ELOW   3,137,228
COFFEE MAKER
Filed March 26, 1963
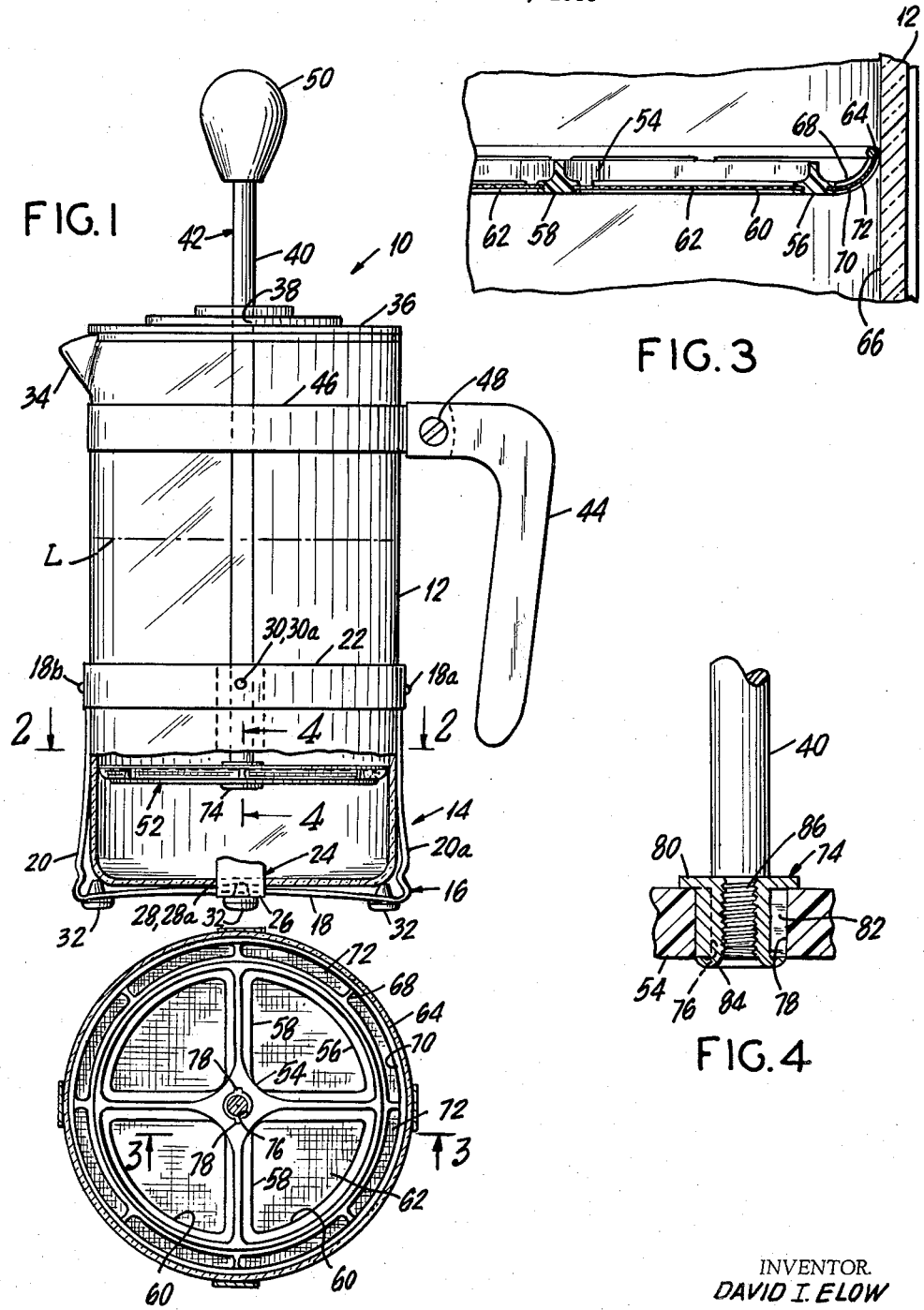
INVENTOR.
DAVID I. ELOW
BY Felshin and Rosen
ATTORNEYS.

3,137,228
COFFEE MAKER
David I. Elow, 76 Disbrow Lane, New Rochelle, N.Y.
Filed Mar. 26, 1963, Ser. No. 267,973
10 Claims. (Cl. 99—287)

This invention relates to coffee makers of the type wherein a movable plunger is provided for separating the brewed coffee from the used coffee grounds.

An object of the invention is to provide a coffee maker of the type indicated with an improved plunger that is especially well adapted to prevent coffee grounds from slipping past the outer edge of the plunger piston into the brewed coffee.

Another object is to provide the coffee maker with a plunger having improved means for connecting the plunger rod to the plunger piston.

A further object is to provide an improved plunger for coffee makers.

The above and other objects, features and advantages of the invention will be more fully understood from the following description of the invention considered in connection with the accompanying drawing of an illustrative embodiment of the invention, in which:

FIG. 1 is a vertical view, partly in section, of a coffee maker in accordance with the present invention;

FIG. 2 is a cross section taken on line 2—2 of FIG. 1;

FIG. 3 is a vertical sectional view, on a larger scale, taken on line 3—3 of FIG. 2; and FIG. 4 is a vertical sectional view, on a larger scale, taken on line 4—4 of FIG. 1.

Referring now to the drawing in detail, the coffee maker 10 comprises an open top cylindrical container or coffee pot 12 mounted in a stand or holder 14. As herein shown, the holder comprises a U-shaped metal strip 16 having a bottom crosspiece 18 from which extend upwardly diametrically opposed vertical side pieces 20 and 20a. The upper ends of the side pieces are interconnected by a cylindrical band 22 riveted thereto as at 18a and 18b. A second U-shaped metal strip 24 has a bottom crosspiece 26 at right angles to crosspiece 18 and riveted to the latter. Crosspiece 26 also has diametrically opposed vertical side pieces 28 and 29a extending upwardly to band 22 to which they are riveted as at 30 and 30a. Rubber cushions 32 can be inserted through openings at the outer ends of crosspieces 16 and 24 to contact the surface on which the holder is placed.

Coffee pot 12 is provided with the usual pouring spout 34 and its open top is closed by a cover 36 having a central aperture 38 through which extends the movable rod 40 of a plunger 42. The coffee maker includes the usual handle 44 which is secured to the coffee pot by a circular band 46 which surrounds and grips the pot above band 22. Band 46 has opposite ends which are secured to the handle by suitable means such as screw 48. The sides 20, 20a, 28 and 28a of the holder grip the sides of the coffee pot with sufficient frictional force so that the pot together with its holder can be lifted by handle 44 only.

The upper end of plunger rod 40 is provided with a gripping knob 50 and the lower end of the rod has a piston 52 connected to it. The piston includes a central hub 54 and an inner circular ring 56, concentric with the hub, and spaced laterally outwardly thereof. A series of radially extending circumferentially spaced spokes 58 extend between the hub and the ring and interconnect the hub and ring to each other and thereby form circumferentially spaced openings 60. A wire mesh screen 62 closes each opening and each screen extends outwardly from the hub throughout the companion opening to cover the latter, and the circular outer edge of the screen is connected to the inner edge of ring 56, as best seen in FIG. 3. It will also be noted, as best seen in FIG. 3 that the inner edge of the screen is connected to the outer edge of hub 54, as will be described more in detail hereinafter.

An outer circular ring 64 is concentrically positioned with respect to hub 54 and inner ring 56 and is spaced laterally outwardly from the latter, at one side of the hub, as best seen in FIG. 3, in sliding contact with the inner cylindrical wall surface 66 of pot 12. A series of circumferentially spaced ribs 68 extend radially between rings 56 and 64 for interconnecting the rings to each other to form circumferentially spaced openings 70 which are closed by wire mesh screens 72. As best seen in FIG. 3, the inner edge of the screen is connected to the outer edge of ring 56. The screen is curved and extends upwardly toward ring 64 and is connected to the inner edge of the latter.

Screens 72 relieve the fluid pressure between the opposite sides of the piston along its outer marginal edge portion and thereby permit easy movement of the piston along the inner wall surface of the pot. Ribs 68, which are curved, as are screens 72, as best seen in FIG. 3, provide resilient members or springs to resiliently bias ring 64 against the inner wall surface of the pot to prevent any coffee grounds from slipping past the piston into the brewed coffee.

It is to be understood that the piston is a unitary structure with the component screens 62 and 72, hub 54, spokes 58, rings 56 and 64, and ribs 68 connected to each other by a molding in situ. More particularly, the component parts of the piston, with the exception of the wire mesh screens, are made of a suitable plastic material, for example polypropylene, while the screens are made of a suitable metal, for example, stainless steel. The screens are placed in the mold cavity in proper relative position and are interconnected to each other by the molding of the remaining plastic parts of the piston. It is to be noted, as best seen in FIG. 3, that the cross section of ring 64 is circular, and the cross section of spokes 58 and ring 56 is an inverted T to give structural rigidity to the piston. The edges of the wire screens are connected to the adjacent edges of the plastic parts of the piston by molding in situ, as indicated above.

In accordance with another important feature of the invention, the lower end of metal rod 40 of the plunger is connected to the plastic hub 54 of the piston by a bushing 74. More particularly, and as best illustrated by FIGS. 2 and 4, the hub is provided with a central circular aperture 76 which has diametrically opposed longitudinally extending through slots 78. The bushing has a circular shoulder 80, at one end, and a pair of diametrically opposite ribs 82 which, in the mounted position of the bushing in the hub, fit into the companion slots 78 to prevent rotation of the bushing in the hub. The lower end 84 of the bushing extends from the bottom of the hub and is suitably peened over, as illustrated, to prevent longitudinal movement of the bushing relative to the hub. The bushing is internally threaded and the lower end of the plunger rod has a reduced threaded part 86 which is screwed into the internal threads of the bushing.

The manner of brewing coffee with the coffee maker of the present invention will now be described. The cover 36 and plunger 42 are removed from the coffee pot 12. Boiling water is then provided in the pot up to a suitable level depending upon the quantity of coffee desired, as for example, up to level L. Ordinary coffee grounds, such as used for percolating, drip or vacuum ground coffee are then introduced into the hot water, and the plunger is placed into the pot and is lowered by pushing down on knob 50. Piston 52 is moved downwardly through the water and the brewed coffee moves up through the openings in the wire mesh screens while preventing the coffee grounds from passing through with the brewed coffee. When the piston is as far down as it will go, the brewed coffee is ready for pouring from the pot through spout 34. Of course, the openings in the screens are of a size to prevent passage of the coffee grounds. Some time should be allowed for the coffee to brew before the plunger is pushed down.

While I have shown and described an embodiment of the invention, it will be understood that the invention may be embodied in forms other than what I have illustrated or described and that changes in the form of arrangement of parts, or both, may be made according to the principle or ideas of the invention within the scope of the appended claims.

This application is related to my co-pending application Serial No. 200,418, filed June 6, 1962, now abandoned.

I claim:

1. A coffee maker, comprising an open top container having a substantially uniform interior cross section, a cover for said open top container having an opening therethrough, a movable rod extending longitudinally through said opening and having a piston at its lower end, said piston comprising an inner ring spaced laterally inwardly from the inner wall surface of said container, a hub positioned within said inner ring and secured to said lower end of said plunger, a series of spokes spaced from each other and extending between said hub and said inner ring to interconnect said hub and said inner ring and form a series of spaced openings, first wire mesh screen means secured to said hub and said inner ring and extending throughout said openings to close the latter and second wire mesh screen means extending laterally beyond the outer edge of said inner ring, and an outer ring spaced laterally outwardly of said inner ring in sliding contact with said inner wall surface of said container, said outer ring being adjacent to the outer edge of said second screen means and connected thereto.

2. A coffee maker, comprising an open top container having a substantially uniform interior cross section, a cover for said open top container having an opening therethrough, a movable rod extending longitudinally through said opening and having a piston at its lower end, said piston comprising an inner ring spaced laterally inwardly from the inner wall surface of said container, a hub positioned within said inner ring and secured to said lower end of said plunger, a series of spokes spaced from each other and extending between said hub and said inner ring to interconnect said hub and said inner ring and form a series of spaced openings, first wire mesh screen means secured to said hub and said inner ring and extending throughout said openings to close the latter and second wire mesh screen means extending laterally beyond the outer edge of said inner ring, an outer ring spaced laterally outwardly of said inner ring in sliding contact with said inner wall surface of said container, said outer ring being adjacent to the outer edge of said second screen means and connected thereto, and a series of spaced ribs extending between said inner ring and said outer ring and interconnecting said inner and outer rings to each other.

3. A coffee maker, comprising an open top container having a substantially uniform interior cross section, a cover for said open top container having an opening therethrough, a movable rod extending longitudinally through said opening and having a piston at its lower end, said piston comprising an inner ring spaced laterally inwardly from the inner wall surface of said container, a hub positioned within said inner ring and secured to said lower end of said plunger, a series of spokes spaced from each other and extending between said hub and said inner ring to interconnect said hub and said inner ring and form a series of spaced openings, first wire mesh screen means secured to said hub and said inner ring and extending throughout said openings to close the latter and second wire mesh screen means extending laterally beyond the outer edge of said inner ring, an outer ring spaced laterally outwardly of said inner ring in sliding contact with said inner wall surface of said container, said outer ring being adjacent to the outer edge of said second screen means, a series of spaced ribs extending between said inner ring and said outer ring and interconnecting said inner and outer rings to each other, said outer ring being positioned at one side of said inner ring, and said hub, inner and outer rings, spokes, ribs and screen means forming a unitary piston by molding in situ, said first and second screen means being metal and said hub, inner and outer rings, spokes and ribs being plastic.

4. A coffee maker, comprising an open top container having a substantially uniform interior cross section, a cover for said open top container having an opening therethrough, a movable rod extending longitudinally through said opening and having a piston at its lower end, said piston comprising an inner ring spaced laterally inwardly from the inner wall surface of said container, a hub positioned within said inner ring and secured to said lower end of said plunger, a series of spokes spaced from each other and extending between said hub and said inner ring to interconnect said hub and said inner ring and form a series of spaced openings, first wire mesh screen means secured to said hub and said inner ring and extending throughout said openings to close the latter and second wire mesh screen means extending laterally beyond the outer edge of said inner ring, and an outer ring spaced laterally outwardly of said inner ring in sliding contact with said inner wall surface of said container, said outer ring being adjacent to the outer edge of said second screen means and connected thereto, said hub having a central aperture with a pair of oppositely positioned slots extending through said hub, a bushing extending through said aperture and having a pair of oppositely positioned ribs positioned in said slots and having a part extending beyond one side of said hub and peened over in contact with said side of said hub to lock said bushing to said hub, said bushing having a threaded hole and said lower end of said rod being threaded and screwed in said threaded hole of said hub for said connection of said piston to said rod.

5. A plunger for a coffee maker, comprising a rod, a piston connected adjacent one end of said rod and a handle connected adjacent the opposite end of said rod, said piston comprising a hub connected to said rod, an inner ring surrounding said hub and spaced laterally outwardly therefrom, a series of spokes spaced from each other and extending between said hub and said inner ring to interconnect said hub and said inner ring and form a series of spaced openings, wire mesh screen means secured to said hub and said inner ring and extending throughout said openings to close the latter and screen means extending beyond the outer edge of said inner ring, and an outer ring spaced laterally outwardly of said inner ring and connected to the outer edge of said last mentioned screen means.

6. A plunger for a coffee maker, comprising a rod, a piston connected adjacent one end of said rod and a handle connected adjacent the opposite end of said rod, said piston comprising a hub connected to said rod, an inner ring surrounding said hub and spaced laterally outwardly therefrom, a series of spokes spaced from each other and extending between said hub and said inner ring to interconnect said hub and said inner ring and form a series of spaced openings, wire mesh screen means secured to said hub and said inner ring and extending throughout said openings to close the latter and screen means extending beyond the outer edge of said inner ring, an outer ring spaced laterally outwardly of said inner ring and connected to the outer edge of said last mentioned screen means, said outer ring being positioned at one side of said inner ring, and said hub, inner and outer rings, spokes, ribs and screen means forming a unitary piston by a molding in situ, both said screen means being metal and said hub, inner and outer rings, spokes and ribs being plastic.

7. A plunger for a coffee maker, comprising a rod, a piston connected adjacent one end of said rod and a handle connected adjacent the opposite end of said rod, said piston comprising a hub connected to said rod, an inner ring surrounding said hub and spaced laterally outwardly therefrom, a series of spokes spaced from each other and extending between said hub and said inner ring to interconnect said hub and said inner ring and form a series of spaced openings, wire mesh screen means secured to said hub and said inner ring and extending throughout said openings to close the latter and screen means extending beyond the outer edge of said inner ring, an outer ring spaced laterally outwardly of said inner ring and connected to the outer edge of said last mentioned screen means, a series of spaced ribs extending between said inner ring and said outer ring and interconnecting said inner and outer rings to each other, said outer ring being positioned at one side of said inner ring, and said hub, inner and outer rings, spokes, ribs and screen means forming a unitary piston by a molding in situ, both said screen means being metal, and said hub, inner and outer rings, spokes and ribs being plastic.

8. A plunger for a coffee maker, comprising a rod, a piston connected adjacent one end of said rod and a handle connected adjacent the opposite end of said rod, said piston comprising a hub connected to said rod, an inner ring surrounding said hub and spaced laterally outwardly therefrom, a series of spokes spaced from each other and extending between said hub and said ring to interconnect said hub and said inner ring and form a series of spaced openings, wire mesh screen means secured to said hub and said inner ring and extending throughout said openings to close the latter and screen means extending beyond the outer edge of said inner ring, and an outer ring spaced laterally outwardly of said inner ring and connected to the outer edge of said second mentioned screen means, said hub having a central aperture with a pair of oppositely positioned slots extending through said aperture and having a pair of oppositely positioned ribs positioned in said slots and having a part extending beyond one side of said hub and peened over in contact with said side of said hub to lock said bushing to said hub, said bushing having a threaded hole and said lower end of said rod being threaded and screwed in said threaded hole of said hub for said connection of said piston to said rod.

9. A coffee maker, comprising a pot, a plunger within the pot comprising a piston said piston comprising a piston member provided with a center hub, a ring concentric therewith, and connected thereto by spokes, and a piston rod attached to the center hub of the piston member and extending upwardly therefrom, said piston member being made of plastic material, and screening material with the plastic material passing through said screening material, said hub, spokes, ring and screening material forming a unitary piston by molding said piston member to said screening material in situ embedded in said plastic material, said piston member having an outer edge in wiping contact with the inside of the pot.

10. A plunger for a coffee maker, comprising a piston having a central plastic hub portion and a piston rod attached to said hub portion and extending therefrom, a plastic ring surrounding said hub and spaced laterally outwardly from said hub, a series of spaced plastic spokes extending between said hub and said ring and interconnecting said hub and said ring to form a series of spaced openings, and wire mesh screen means positioned in said openings to close the latter and embedded in adjacent portions of said plastic hub, spoke and ring, said hub portion, ring, spokes and wire mesh screen means forming a unitary piston by molding of said hub portion, ring and spokes to said mesh screen means in situ.

References Cited in the file of this patent
UNITED STATES PATENTS

| 2,211,486 | Zoia _____ Aug. 13, 1940 |
| 3,082,587 | Brimberg _____ Mar. 26, 1963 |

FOREIGN PATENTS

| 671,895 | Great Britain _____ Mar. 14, 1952 |